Feb. 28, 1950  D. ROLES  2,499,037
VACUUM PICKER AND HARVESTER
Filed April 13, 1945  3 Sheets-Sheet 1
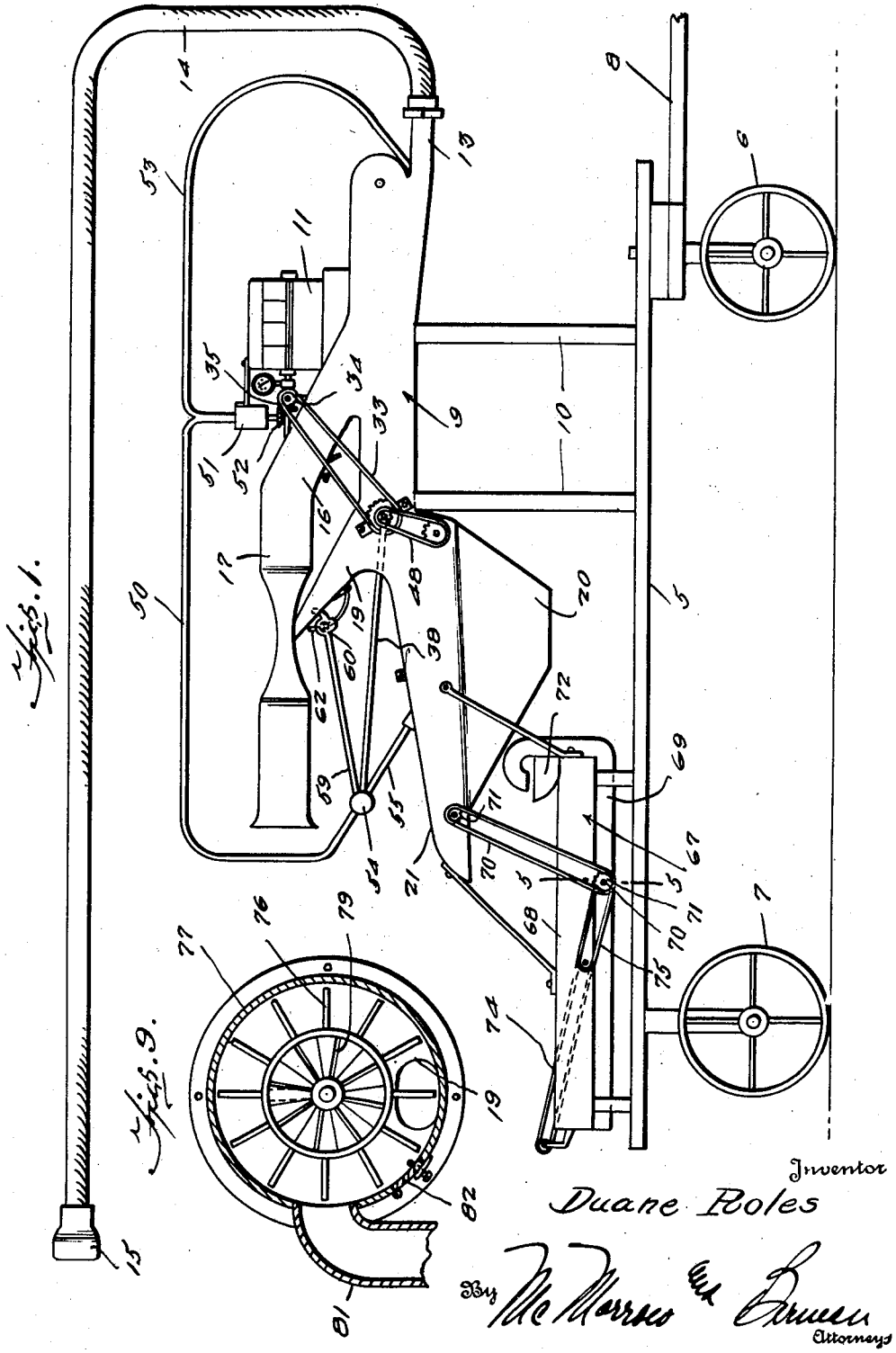
Inventor
Duane Roles

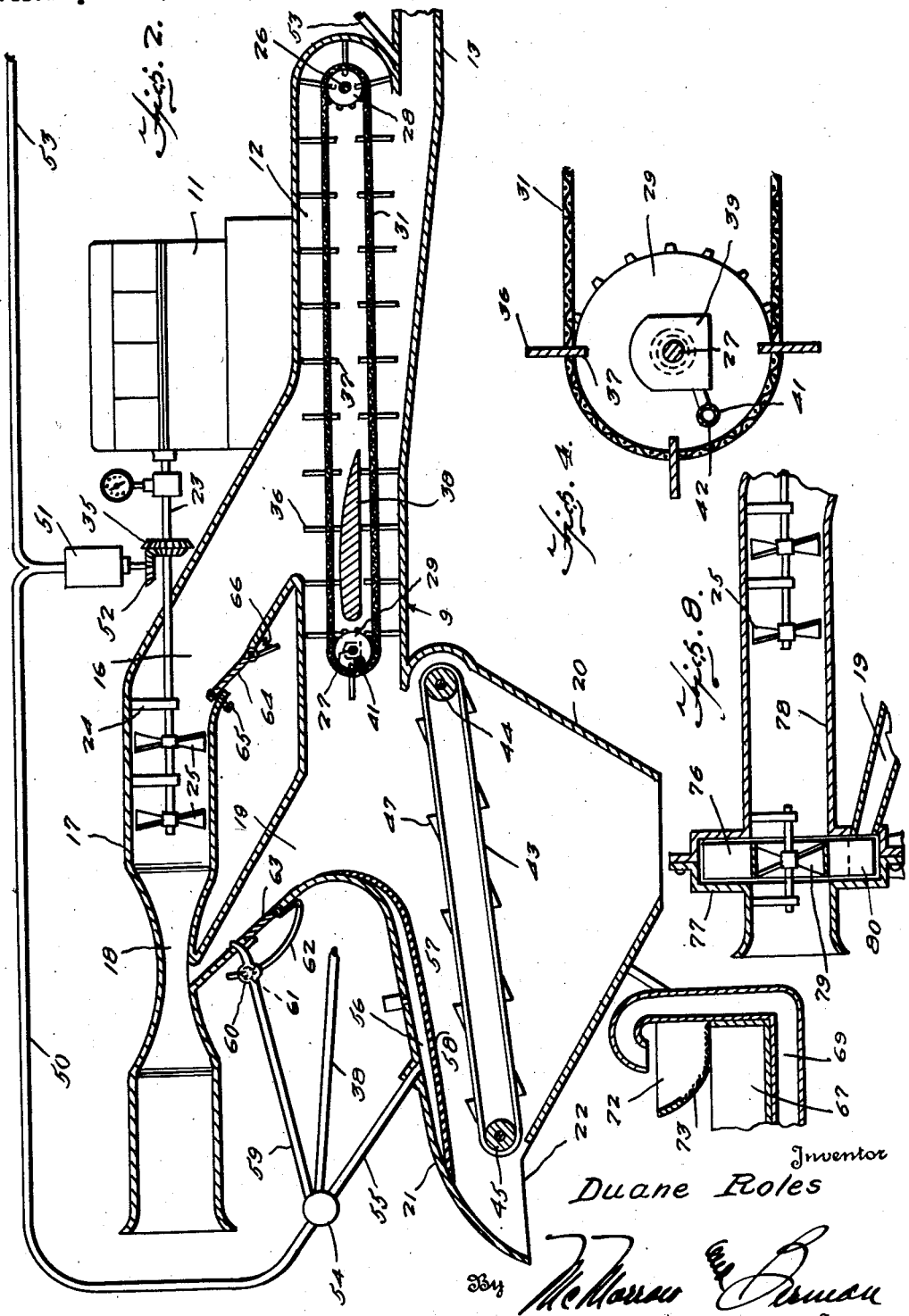

Feb. 28, 1950 D. ROLES 2,499,037
VACUUM PICKER AND HARVESTER
Filed April 13, 1945 3 Sheets-Sheet 3
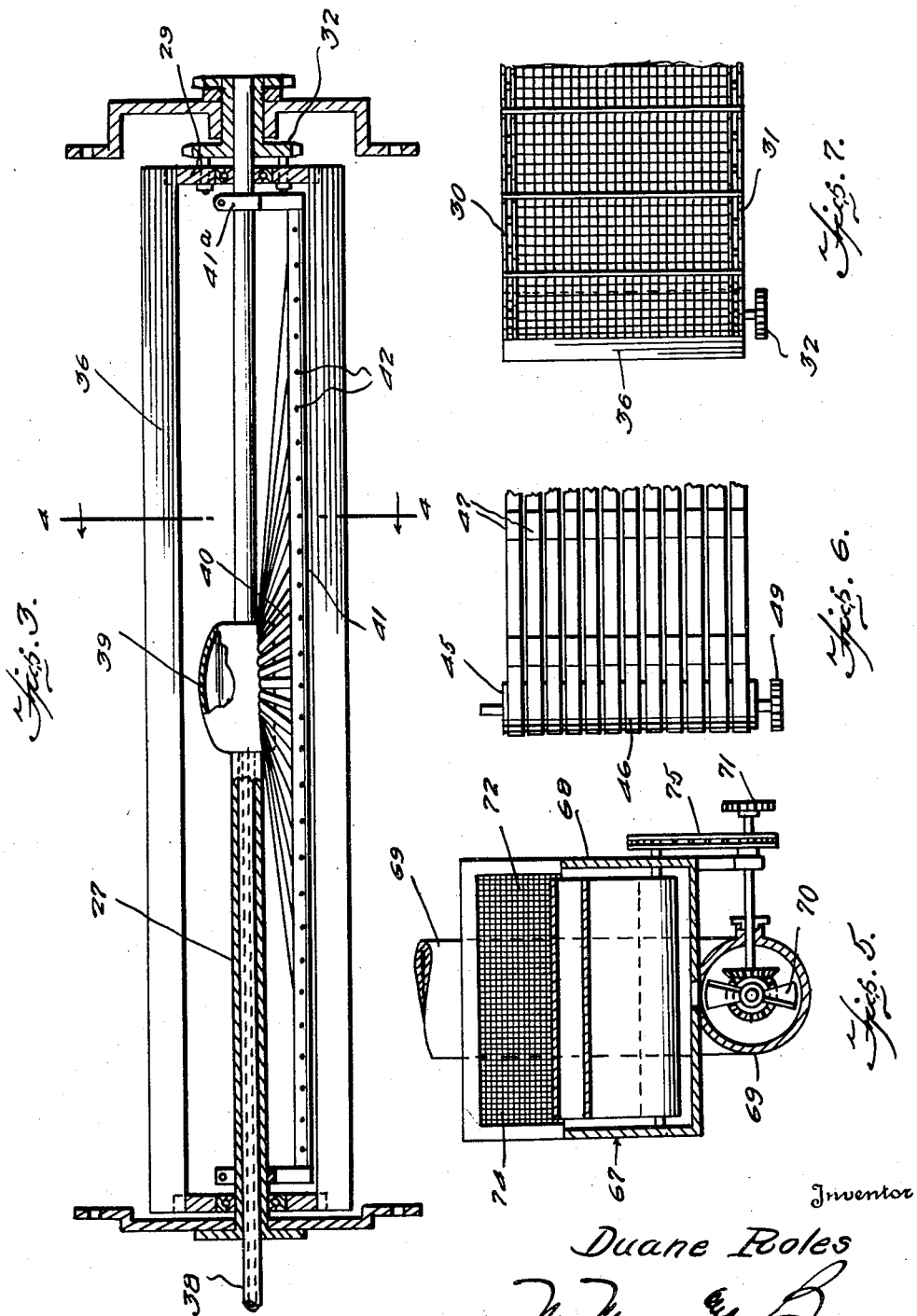
Inventor
Duane Roles Patented Feb. 28, 1950

2,499,037

UNITED STATES PATENT OFFICE 2,499,037

VACUUM PICKER AND HARVESTER

Duane Roles, Roseburg, Oreg.

Application April 13, 1945, Serial No. 588,126

6 Claims. (Cl. 209—136)

1

The present invention relates to new and useful improvements in harvesting machines generally, and more particularly to a machine of this character for picking and harvesting small and medium sized fruit, such as grapes, olives, strawberries, and nuts such as pecans, hazelnuts and the like.

An important object of the present invention is to provide such means including a flexible hose having an intake nozzle at its outer end and adapted to pick either growing fruit, berries, nuts and the like, or for harvesting fallen fruits or berries, or nuts.

A further object of the invention is to provide a picking and harvesting apparatus including suction-operated means for picking the products, separating trash therefrom and conveying the same to a washing and crating apparatus, all of said operations being carried out on a portable apparatus adapted for movement over the field or through an orchard.

Another object of the invention is to provide a power plant carried by the apparatus for generating the desired suction for picking or harvesting the product and also subjecting the product to continuous suction while passing through the machine for removing trash therefrom.

A still further object of the invention is to provide control means for regulating the suction to which the product is subjected.

Another object of the invention is to provide an apparatus of this character embodying means for handling the fruit or other product without danger of bruising or injuring the same.

A still further object is to provide an apparatus of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, the in which:

Figure 1 is a side elevational view.

Figure 2 is an enlarged longitudinal sectional view of the housing for the conveyor and separating mechanism.

Figure 3 is an enlarged end elevational view of the conveyor showing the ejector at the discharge end thereof.

Figure 4 is a transverse sectional view taken substantially on a line 4—4 of Figure 3.

2

Figure 5 is a transverse sectional view of the washer.

Figure 6 is a fragmentary top plan view of one end of the sifter conveyor.

Figure 7 is a similar view of one end of the front conveyor belt.

Figure 8 is a fragmentary longitudinal sectional view of a modified trash-removing tube embodying a turbine-type blower.

Figure 9 is a transverse sectional view through the blower.

Referring now to the drawings in detail, wherein for the purpose of illustration I have disclosed a preferred embodiment of the invention, the numeral 5 designates a vehicle body or platform supported on front and rear wheels 6 and 7 for traveling over a field or through an orchard, the front end of the body having a tongue 8 attached thereto by means of which the vehicle may be attached to a tractor or other means for drawing the vehicle over the ground.

A suction housing designated generally at 9 is supported on suitable supporting members 10 carried by the body 5 of the vehicle and on which is also supported a conventional form of power plant 11 which may be in the form of an internal combustion engine.

As shown to advantage in Figure 2 of the drawings, the housing 9 includes a longitudinally extending chamber 12 having a tubular extension 13 projecting forwardly from its front lower portion and to which a flexible hose 14 is attached at one end, the other end of the hose having a suction nozzle 15 attached thereto.

A conduit or relatively large pipe 16 rises from the top of the chamber 12 adjacent its rear portion and terminates in a rearwardly extending conduit 17 having a venturi 18 formed therein.

A tapering conduit 19 extends upwardly from the rear end of the chamber 12 and communicates with the intermediate portion of the venturi 18.

A discharge funnel 20 is formed at the lower rear portion of the housing 9 at the rear end of the chamber 12, the rear upper portion of the funnel having a top wall 21 which projects rearwardly beyond the funnel and is open at its bottom to provide a discharge opening 22.

The shaft 23 of the power plant 11 extends rearwardly into the front end of the tube 17 and is journaled therein by means of bearings 24.

A plurality of suction fans 25 are secured to the shaft 23 in the tube 17 and by means of which air is drawn upwardly in the conduit 16 through the chamber 12 and by means of which suction is created in the nozzle 15 to pick up small and medium fruits and berries, nuts and other products to be harvested.

Front and rear shafts 26 and 27 are journaled transversely in the chamber 12 on which sprockets 28 and 29 are journaled for driving chains 30 secured at the side edges of an endless conveyor 31, the conveyor being of mesh material to permit the free passage of air therethrough.

One end of the shaft 27 is provided with a double sprocket or pulley 32 connected to the sprocket 29 and driven by a chain or belt 33 from a pulley or sprocket 34 operatively connected to the shaft 23 by means of double-faced gearing 35.

The conveyor 31 is provided with transversely extending, spaced-apart cleats or blades 36, preferably constructed of flexible rubber or other resilient material, the cleats extending vertically with their upper and side edges in wiping contact with the walls of the chamber 12 and with their lower edges extending through one of the flights of the conveyor 31, as indicated at 37, and in wiping contact with the upper and lower surfaces of a sealing plate 38 extending transversely between the upper and lower flights of the conveyor 31 at the rear end of the chamber 12 and in advance of the rear shaft 27. Accordingly, the rear end of the chamber 12 is sealed against the passage of air therethrough so that the suction force created by the fan blades 25 will travel from the flexible hose 14 into the tubular extension 13 and upwardly through the mesh material of the conveyor 31 through the conduit 16, as indicated by the arrows in Figure 2 of the drawing, and out through the venturi 18.

The fan blades 25 also function as a blower to force the air through the venturi 18 and since the tapering conduit 19 is connected to the venturi at its restricted portion, considerable suction will be created in the conduit 19 at the rear end of the conveyor 31.

The fruit, berries, nuts or other products picked up by the nozzle 15 accordingly will enter the lower portion of the chamber 12 from the extension 13 and be drawn against the lower flight of the conveyor 31 and will then be moved by the conveyor cleats 36 rearwardly for discharge at the rear end of the chamber 12.

In order to facilitate the discharge of the products, trash and other material from the conveyor 31, the shaft 27 is stationary and of hollow construction at one end for attaching a compressed air pipe 38' thereto, the central portion of the shaft 27 being formed with a spray head 39 from which a plurality of pipes 40 lead to a transversely extending spray pipe 41 suspended from the shaft 27 by hangers 41a, the pipe 41 having discharge orifices 42 therein and by means of which air is discharged in a rearward direction through the mesh material at the rear end of the conveyor 31. Accordingly, the outer surface of the conveyor 31 is cleaned of any of the fruit, trash or other material having a tendency to cling thereto, the trash or lighter material is drawn upwardly through the conduit 19 and outwardly through the venturi 18 for discharge from the rear of the machine.

The fruit or other products and heavy material are deposited on an endless conveyor 43 traveling on front and rear rollers 44 and 45 journaled in the upper portion of the funnel 20.

The conveyor 43 is constructed of a plurality of endless strips of material 46 mounted in spaced-apart relation on the rollers 44 and 45 to function as a sifter to permit small heavy objects to pass through the conveyor 43 for discharge from the lower end of the funnel 20.

The outer surfaces of the strips 46 are provided with transversely extending cleats 47 by means of which the fruit or other products are conveyed rearwardly for discharge through the opening 22 at the rear end of the housing 9.

The conveyor 43 is driven by a flexible drive member, such as a belt or chain 48, from the sprocket 32 and operatively connected to a pulley or sprocket 49 on the front roller 44.

The compressed air pipe 38' is connected to a pipe 50 leading from a compressed air motor 51 operated by a gear 52 from one side of the gear 35 and a compressed air pipe 53 also leads from the motor 51 to the front end of the chamber 12.

At the junction of the pipe 38' with the pipe 50 is a pressure regulator or valve 54 from which also leads a branch pipe 55 communicating with a chamber 56 in the top wall 21 above the conveyor 43. The inner wall 57 of the chamber 56 is formed with orifices 58 by means of which air is discharged downwardly on the conveyor 43 for cleaning the material and trash therefrom.

Another branch compressed air pipe 59 leads from the valve or regulator 54 to the upper portion of the conduit 19, the pipe 59 having a housing 60 formed therein in which a ball valve 61 is positioned for controlling communication through the pipe 59.

A manually controlled lever 62 extends upwardly through the housing 60 and is connected to the ball 61 for raising or lowering the ball into and out of position for closing the pipe 59 and a rod 62 extends downwardly through the housing 60 and is also attached to the ball 61, the lower end of the rod 62 being attached to a pivoted door 63 in the wall of the conduit 19 and operable upon a raising or lowering movement of the rod 62 to open or close the door to admit air into the conduit 19 to reduce the suction or vacuum therein.

The end of the pipe 59 projecting into the conduit 19 constitutes a nozzle which is curved upwardly for admitting air under pressure into the upper portion of the conduit 19 to thus increase the vacuum created therein.

A pivoted door 64 is likewise connected to one side of the conduit 16 for admitting air from the atmosphere into the conduit, the free edge of the door 64 being adjustable by means of a screw 65, the pivoted edge of the door 64 being placed under tension of a coil spring 66 for urging the door in its closed position.

The fruit or other harvested products are discharged from the opening 22 into a washer designated generally at 67 supported at the rear end of the body 5 of the vehicle and which includes a water pan 68 adapted to contain water for washing the fruit, the bottom of the pan having a trough or pipe 69 communicating therewith with a pump of conventional construction indicated at 69a operatively mounted therein and driven by means of a belt and pulleys 70 and 71 from the rear roller 45 of the conveyor 43. The pipe 69 extends upwardly at the front end of the pan 68 for discharging the water into a trough or pan 72 having a screen bottom 73 by means of which the sediment collected in the bottom of the pan 68 is removed.

Extending upwardly from the rear portion of the pan 68 is an endless conveyor 74 operated by means of belt and pulleys 75 from the pulley 71 of the pump, the front end of the conveyor 74 extending downwardly into the water in the pan 68 and by means of which the fruit is conveyed from the pan into a suitable receptacle or crate.

If desired, the venturi 18, as illustrated in Figures 1 and 2 of the drawings, may be eliminated and a turbine-type blower 76 mounted in a housing 77 at the rear end of the tube or conduit 78.

The blower 76 includes a plurality of centrally disposed blades 79 operated by the force of air from the fan blades 25 driven by the power plant as heretofore explained and the blower 76 includes a plurality of blades 80 at the outer edge thereof for blowing trash and other foreign matter received from the upper end of the conduit 19 into the lower portion of the housing 77 and for discharging the same through a discharge pipe 81 connected to the housing 77, as will be apparent from an inspection of Figures 8 and 9 of the drawings.

A manually operated pivoted door 82 is mounted in one side of the housing 77 to regulate the pressure created by the blades 80.

In the operation of the device, either fallen fruit or nuts, or ripened fruit, nuts and berries may be picked by the nozzle 15 and drawn into the chamber 12 by the suction of air created by the fans 25 and conveyed rearwardly of the chamber 12 by the conveyor 31. The fruit and other heavy objects are discharged from the rear end of the conveyor 31 onto the conveyor 43 and trash and other light foreign material is drawn upwardly through the conduit 19 for discharge from the tube 17.

Small heavy objects are sifted through the conveyor 43 and discharged from the funnel 20, while the fruit is then discharged into the washer 67.

In view of the foregoing description, taken in conjunction with the accompanying drawings, it is believed that a clear understanding of the construction, operation and advantages of the apparatus will be quite apparent to those skilled in the art. A more detailed description thereof is accordingly deemed unnecessary.

It is to be understood, however, that even though I have herein shown and described a preferred embodiment of my invention, the same is susceptible to having certain changes made fully comprehended by the spirit of the invention as herein described, and the scope of the appended claims.

Having described the invention, what I claim is:

1. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a second suction conduit communicating at one end thereof with another portion of the housing at the rear end of said conveyor and communicating at the other end thereof with the suction means in order to draw trash and the like from said conveyor, movable means for receiving the products of said conveyor when separated from the trash and moving said products to a predetermined delivery point, and means for operating the suction means, conveyor and movable means.

2. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a second suction conduit communicating at one end thereof with another portion of the housing at the rear end of said conveyor and communicating at the other end thereof with the suction means in order to draw trash and the like from said conveyor, compressed air means connected to said upper end of said second suction conduit for increasing the suction therein, movable means for receiving the products of said conveyor when separated from the trash, and means for operating the suction means, compressed air means, conveyor and movable means.

3. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a second suction conduit communicating at one end thereof with another portion of the housing at the rear end of said conveyor and communicating at the other end thereof with the suction means in order to draw trash and the like from said conveyor, movable screening means for receiving the products of said conveyor when separated from the trash and simultaneously screening said products and moving the latter to a predetermined delivery point, a downwardly-directed funnel beneath the movable screening means for receiving screened material from said products during movement thereof and directing the screened material away from said delivery point, and means for operating the suction means, conveyor and movable screening means.

4. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a second suction conduit communicating at one end thereof with another portion of the housing at the rear end of said conveyor and communicating at the other end thereof with the suction means in order to draw trash and the like from said conveyor, compressed air means connected to said other end of said suction conduit for increasing the suction therein, movable screening means for receiving the products of said conveyor when separated from the trash and simultaneously screening said products and moving the latter to a predetermined delivery point, a downwardly-directed funnel beneath said movable screening means for receiving screened material from said products during movement thereof and directing the screened material away from said delivery point, and means for operating the suction means, conveyor and movable screening means.

5. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a rearwardly-extending tube connected to the suction conduit with a Venturi section therebetween, having the suction means include driven suction fans in said suction conduit, a second suction conduit directed rearwardly with one end communicating with the housing rearwardly of the conveyor and the other end thereof communicating with the Venturi section in order to draw trash and the like from said conveyor, a compressed air tube communicating with said other end of said suction conduit exteriorly of said Venturi section for directing compressed air up through said other end of said second suction conduit toward said Venturi section in order to increase the suction in the second suction conduit, drive means for supplying compressed air to said compressed air tube, movable screening means for receiving the products of said conveyor when separated from the trash and simultaneously screening said products and moving the latter to a predetermined delivery point, and a downwardly-directed funnel beneath said movable screening means for receiving screened material from said products during movement thereof and directing said screened material away from said predetermined delivery point.

6. In a separator for fruits, nuts and the like, comprising a continuous mesh web forming an endless conveyor with a series of transverse cleats mounted thereon and extending from both surfaces thereof, an elongated surrounding housing enclosing the conveyor with the cleats in wiping contact with the walls of the housing, suction means for the separator, and a suction conduit communicating with the upper portion of the housing and with the suction means, the improvements which include a centrally-disposed sealing plate within the conveyor in contact with the inner ends of the cleats to form with the conveyor and the housing a continuous sealed area within the housing at a point spaced from the rear end of said conveyor, a rearwardly-extending tube connected to the suction conduit with a Venturi section therebetween, having the suction means include driven suction fans in said suction conduit, a second suction conduit directed rearwardly with one end communicating with the housing rearwardly of the conveyor and the other end thereof communicating with the Venturi section in order to draw trash and the like from said conveyor, a compressed air tube communicating with said other end of said suction conduit exteriorly of said Venturi section for directing compressed air up through said other end of said second suction conduit toward said Venturi section in order to increase the suction in the second suction conduit, drive means for supplying compressed air to said compressed air tube, a perforate pipe supported within the rear end of said conveyor, a further pipe interconnecting said perforate pipe with the compressed air tube to supply compressed air to the perforate pipe, movable screening means for receiving the products of said conveyor when separated from the trash and simultaneously screening said products and moving the latter to a predetermined delivery point, still another pipe connected to said compressed air tube for supplying air under pressure to said movable screening means, and a downwardly-directed funnel beneath said movable screening means for receiving screened material from said products during movement thereof and directing said screened material away from said delivery point.

DUANE ROLES.

REFERENCES CITED

The following references are of record in the file of this patent:

UNITED STATES PATENTS

| Number | Name | Date |
| --- | --- | --- |
| 879,771 | Hollingsworth | Feb. 18, 1908 |
| 1,185,110 | Le Baron | May 30, 1916 |
| 1,302,531 | Dilley | May 6, 1919 |
| 2,226,009 | Miller | Dec. 24, 1940 |